Nov. 23, 1926.

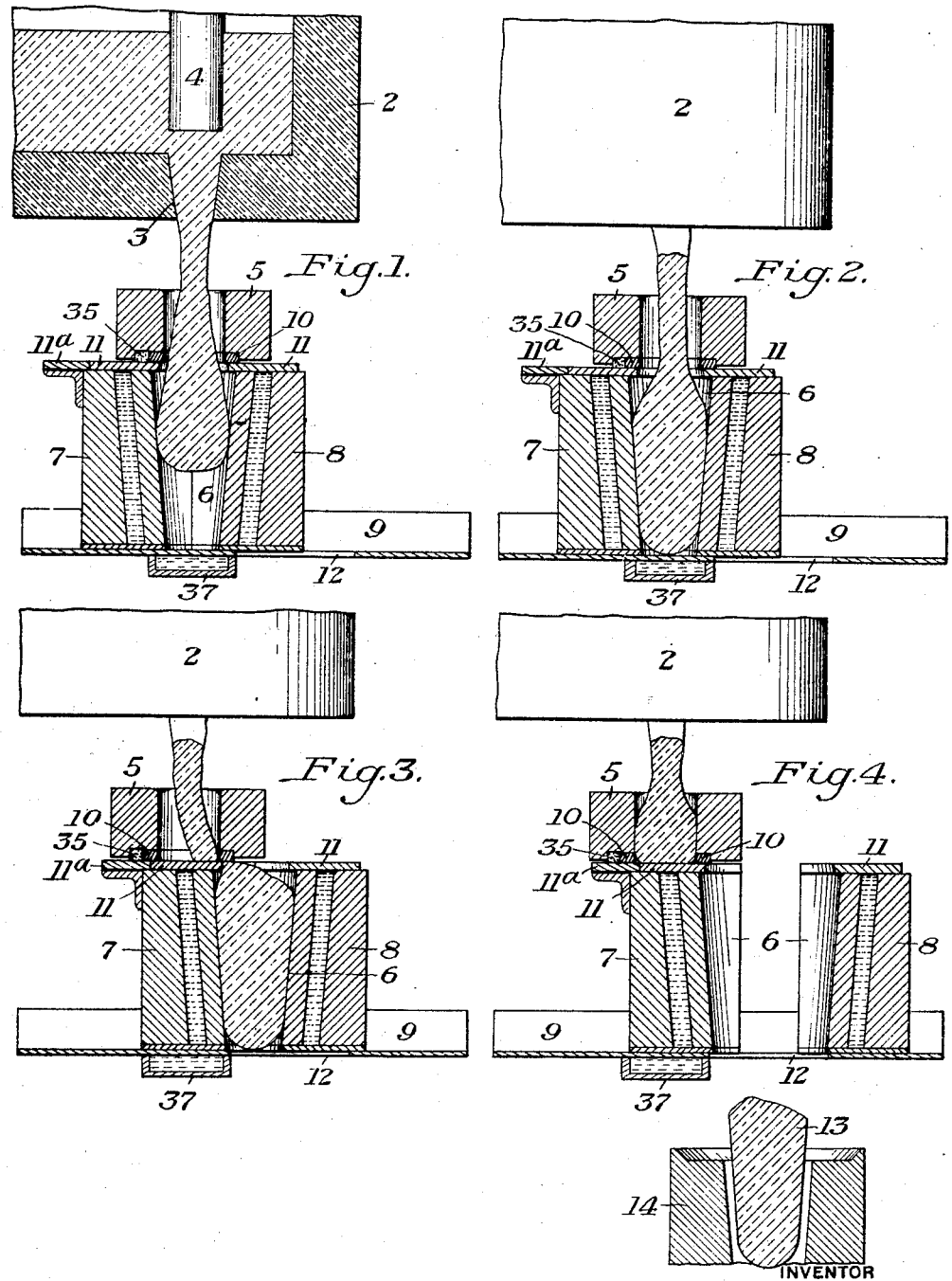

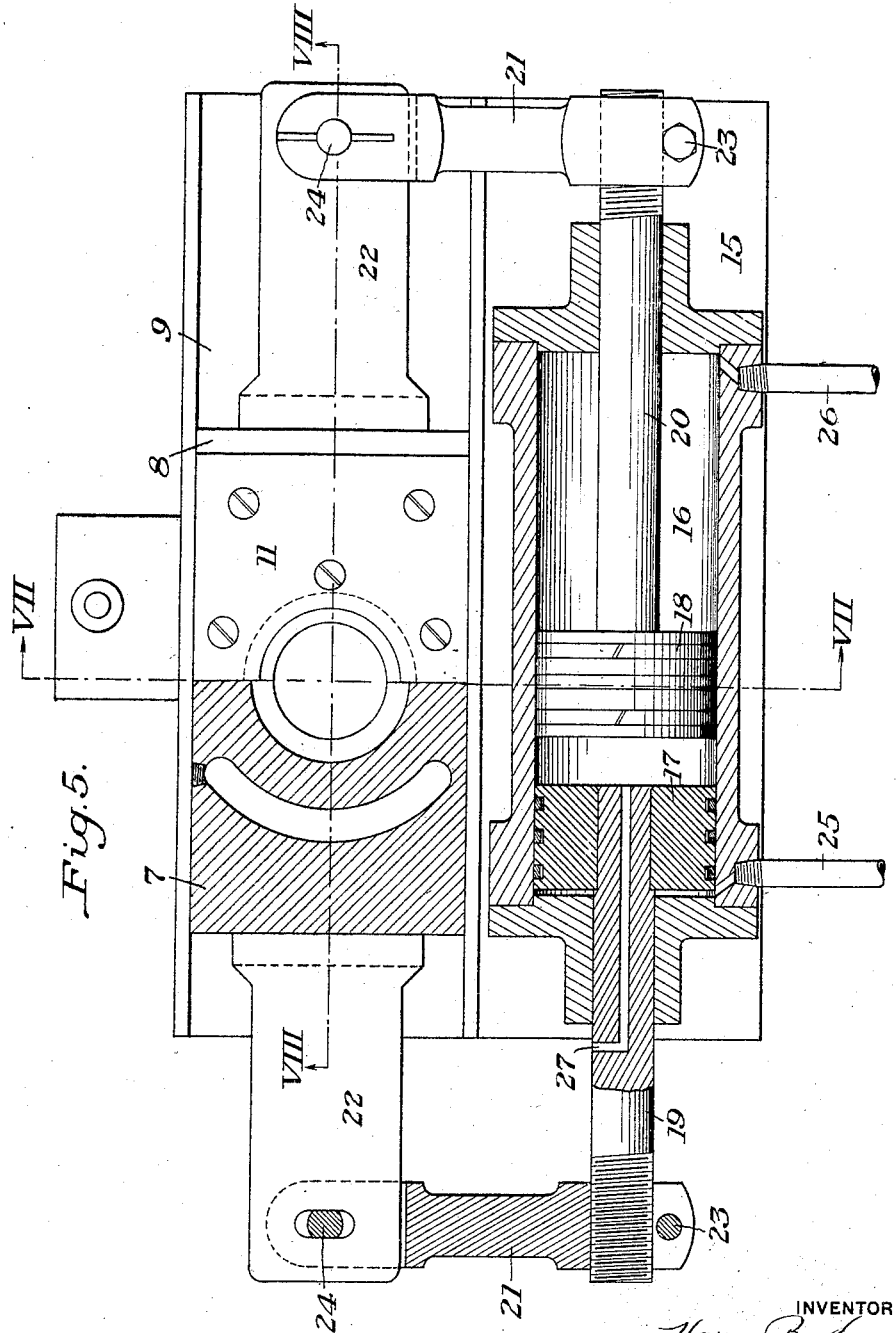

H. B. LAWSON 1,608,326

APPARATUS FOR FEEDING GLASS

Filed Oct. 14, 1922   7 Sheets-Sheet 3

INVENTOR
Harry B. Lawson,
by Byrnes, Stebbins & Parmelee,
his Attys

Nov. 23, 1926.

H. B. LAWSON 1,608,326

APPARATUS FOR FEEDING GLASS

Filed Oct. 14, 1922  7 Sheets-Sheet 4

INVENTOR
Harry B. Lawson,

Nov. 23, 1926.
H. B. LAWSON
1,608,326
APPARATUS FOR FEEDING GLASS
Filed Oct. 14, 1922     7 Sheets-Sheet 5
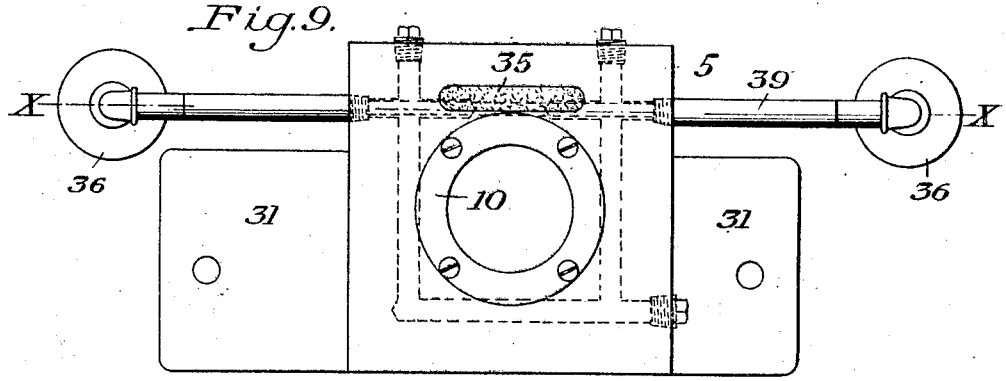
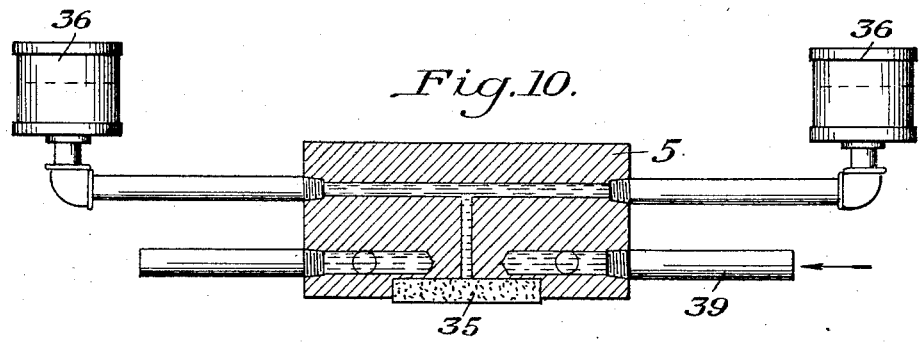
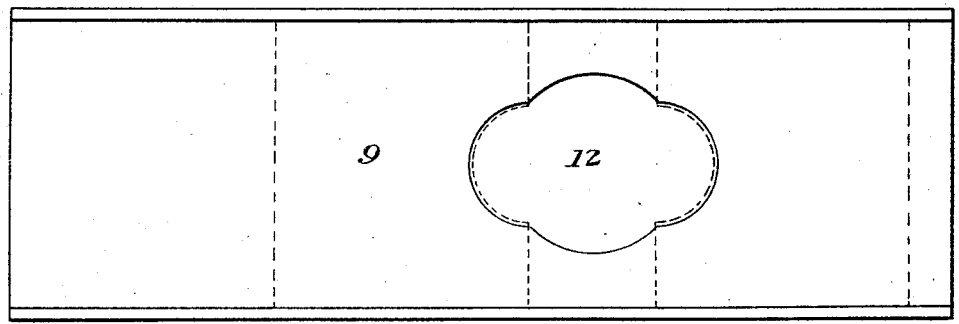
INVENTOR
Harry B. Lawson, Nov. 23, 1926.  
H. B. LAWSON  
1,608,326  
APPARATUS FOR FEEDING GLASS  
Filed Oct. 14, 1922    7 Sheets-Sheet 6

INVENTOR  
Harry B. Lawson,  
by Byrnes Stebbins Parmelee,  
his atty.

Nov. 23, 1926.　　　　　　　　　　　　　　1,608,326
H. B. LAWSON
APPARATUS FOR FEEDING GLASS
Filed Oct. 14, 1922　　7 Sheets-Sheet 7

INVENTOR
Harry B. Lawson

Patented Nov. 23, 1926.

1,608,326

UNITED STATES PATENT OFFICE.

HARRY B. LAWSON, OF HUNTINGTON, WEST VIRGINIA, ASSIGNOR, BY MESNE ASSIGN-MENTS, TO BALL BROTHERS COMPANY, OF MUNCIE, INDIANA, A CORPORATION OF INDIANA.

APPARATUS FOR FEEDING GLASS.

Application filed October 14, 1922. Serial No. 594,463.

The present invention relates broadly to the feeding of measured charges of molten glass, supplied by a continuously flowing stream, to bottle blowing machines, pressing machines and the like.

Numerous methods of cutting off a charge of glass from a continuously flowing stream and delivering it to a blowing machine have been attempted heretofore. In some of these methods shears have been used to sever the stream of glass, allowing the severed portion to collect in a cup before being delivered to the bottle blowing machine. In other cases the shears have been used to temporarily cut off or support the stream. Under these conditions of intermittent flow, the glass has a tendency to twist or spiral in its path. This results in an overlapping of the glass and the entrapping of air whereby the finished product is "blistered" or otherwise blemished. By my invention the stream is severed without any resulting twisting or overlapping, and blemishes from this cause are obviated.

Numerous other glass feeding means have been found objectionable in practice on account of the accurate timing required, their intricacy and liklihood of getting out of order under the severe working conditions imposed on them. The present invention provides a simple and reliable feeding and charge-forming means, and an improved method of water cooling, both of which ensure a minimum of trouble in actual operation.

In the present invention there are provided two receivers in the line of the flowing stream of glass, one superimposed upon the other. The upper receiver is stationary and is normally open at the bottom, whereby the molten glass may flow through it into the lower receiver which is normally closed at the bottom. The lower receiver may also be utilized to shape the charge of glass. That is it may also function as a pre-forming mold, ensuring a better product from the glass working machine. The glass continues to flow into the lower receiver until the glass working machine to which the feeder is applied is ready to receive a charge. At this moment, by suitably timed operating mechanism, the lower receiver or pre-forming mold is moved out of the line of the flowing stream into delivery position, where it discharges its contents to the glass working machine.

The movement of the lower receiver serves to shear the stream of glass between the two receivers and at the same time bring a bottom plate under the upper receiver. The glass stream flows uninterruptedly into the upper receiver until the lower one is moved back to normal position. At this time the glass contained in the upper receiver descends into the lower one and the flow continues as before until the glass working machine is ready for another charge.

The accompanying drawings are illustrative only of one embodiment of my invention, it being understood that they do not define the limits of the invention as changes may be made in the construction or operation disclosed herein without departing from the spirit of the invention or the scope of my broader claims.

In the drawings,—

Figures 1 to 4 are diagrammatic views illustrating the successive steps in the feeding of a charge of glass to the glass working machine;

Figure 5 is a top view, partly in section, showing a feeder embodying the present invention;

Figure 9 is a bottom view of the upper receiver;

Figure 10 is a section on the line X—X of Figure 9;

Figure 11 is a top plan view of the channel carrying the lower receiver or pre-former;

Figure 6:
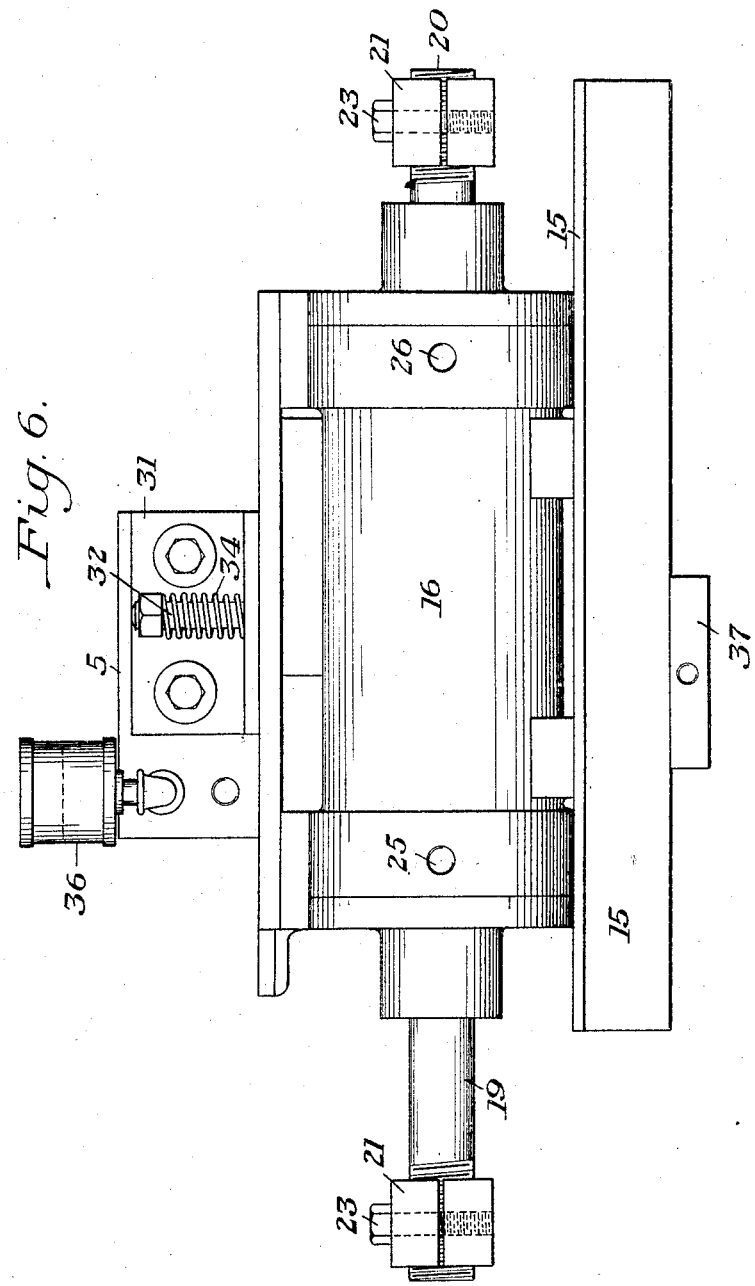
Figure 6 is a side elevation of the construction illustrated in Figure 5.
Figure 7:
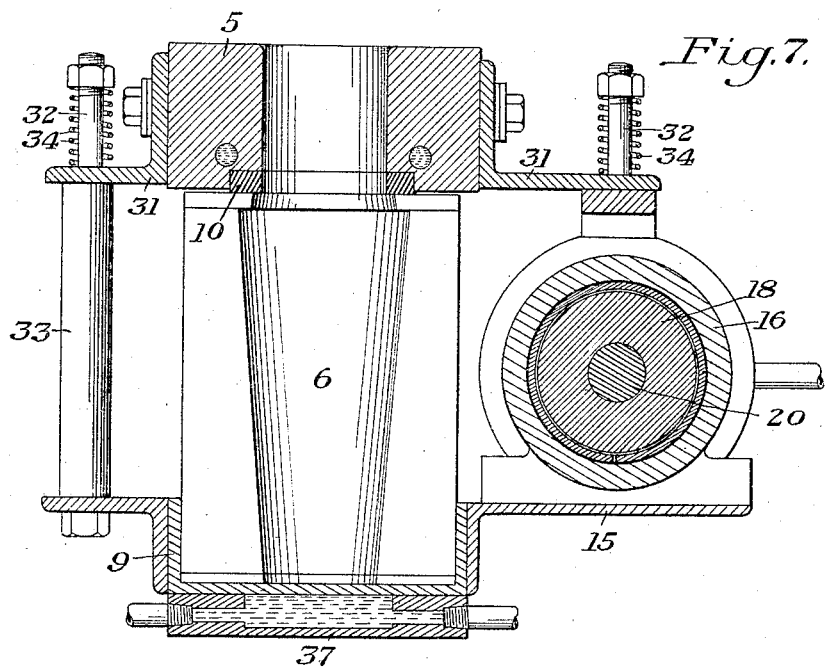
Figure 7 is a sectional view on the line VII—VII of Figure 5.

In the illustrated embodiment of my invention there is provided a boot 2 connected to a tank of usual construction for supplying molten glass. In the boot 2 is a flow opening 3 to allow egress of the molten glass in a continuous stream. The rate of flow may be controlled by a plug 4, adjustable up or down at the will of the operator, to partially choke the glass flow, but which remains stationary during the feeding operation.

The stream descends through a stationary receiver 5 into a lower receiver or pre-forming mold 6, which may be split along its vertical axis into two halves 7 and 8 to facilitate the discharge of the glass therefrom. The pre-forming mold, as illustrated herein, is in the form of an inverted frustum of a cone, and the diameter at the lower end is preferably smaller than the diameter of the receiver 5. A channelled guide 9 slidably supports the pre-forming mold 6. While this guide may serve as the bottom closure of the pre-forming mold, proper timing and proportioning has shown that this function of the channel need not be relied upon.

The volume of this pre-forming mold is preferably only a little greater than the volume of the charge of glass it is desired to feed, as I have found this ensures the delivery of more nearly uniform charges of molten glass.

Glass continues to flow into the pre-forming mold 6, through the receiver 5, at a rate determined by the position of the plug 4 until such time as the operating means hereinafter described moves the pre-forming mold to the delivery position shown in Figure 4. As the mold 6 moves in the channel 9 from under the receiver 5, a shearing ring 10 forming a part thereof cooperates with a plate 11, forming the top of the half mold 7 to sever the glass. The half-mold 8 is provided with a similar plate 11. As shown in Figure 3, this severing is accomplished with hardly any displacement of the stream, and I have found that it causes no twisting or spiral flow.

The mold 6 slides in the channel guide 9 until it reaches an opening 12 in the bottom thereof. At this point the operating means hereinafter described separates the half-molds 7 and 8, allowing the charge of glass 13 to drop through the opening 12. This charge may be received by a parison mold 14 forming a part of a bottle-blowing, pressing or forming machine. The opening 12 is preferably shaped as shown in Figure 11, in which the dotted lines indicate the position of the half-molds 7 and 8 at the end of the feeding stroke.

At the beginning of a run, the parts of the feeder are cold and the glass is delivered in a chilled and stiff condition. The ends of the opening 12 by being cut away to correspond to the shape of the pre-forming mold allow the glass charge and also slivers of glass which may stick to the mold, to drop out easily.

The travel of the pre-forming mold 6 from the path of the glass stream brings the plate 11 beneath the receiver 5. This plate forms a closure for the bottom of the receiver 5 thereby providing a cup which receives the glass during the movement of the pre-forming mold into and out of receiving position. As shown in Figure 4, the glass spreads and begins to fill the receiver 5. When the pre-forming mold 6 moves back to the position shown in Figure 1, the accumulated glass drops into the pre-forming mold. As the head of the stream is of the same diameter as the opening in the receiver 5, and as the mold 6 is tapered so it is smaller at the bottom than the receiver 5, the stream of glass is prevented from falling directly to the bottom of the mold 6 and is caught by the sides a short distance from the top. This prevents any rapid attenuation of the stream and eliminates any tendency for it to twist or overlap. After being checked in its downward movement by the sides of the mold, the glass begins to take the form of the mold and move downwardly, but never at such a rate as to unduly attenuate the stream. As the sides of the stream are held by the sides of the pre-forming mold, there is a tendency for the central hotter portion of the stream to move downwardly. This is highly desirable as the temperature of the charge in the pre-forming mold is thereby more nearly equalized, preventing any undue chilling of any one portion.

The channel 9 carries at one side thereof a bracket 15 on which there is supported an operating cylinder 16. In the cylinder are pistons 17 and 18, with their corresponding piston rods 19 and 20. The piston rods 19 and 20, respectively, are connected by arms 21 and brackets 22 to the half-molds 7 and 8. The arms 21 have a threaded connection with the piston rods to provide for adjustment, and are held in position by clamping bolts 23. Pins 24 fasten the arms 21 to the brackets 22. These pins engage with slots in the brackets to prevent binding in case the operative cylinder and the channel guide get out of alinement under the severe operating conditions. The pistons are preferably operated by air under pressure, supplied through pipes 25 and 26.

When the air is admitted through the pipe 25, the piston 17 moves to the right, as shown in Figure 5, carrying with it the half-mold 7, which pushes the half-mold 8 before it. The piston 17 moves to the right until its arm 21 strikes the cylinder head. In the piston rod 19 is an air passage 27. When the piston 17 ends its stroke, the left-hand end of the air passage is inside the cylinder and air passes through it and acts on the piston 18, moving it forward independently of the piston 17 and its connected parts. The piston 18 moves with it the half-mold 8, which is carried forward and away from the half-mold 7 until the piston 18 cushions against the cylinder head. At this time half-molds 7 and 8 are in the position shown in Figure 4, and the glass is free to fall into the parison mold 14.

Air is then admitted through the pipe 26 to force the piston 18 to the left. The half-mold 8 strikes its mate 7 and both halves are moved back together toward their receiving position until the piston 17 cushions against the cylinder head. During this movement the pipe 25 serves as an exhaust for the air back of the pistons.

Figure 15:
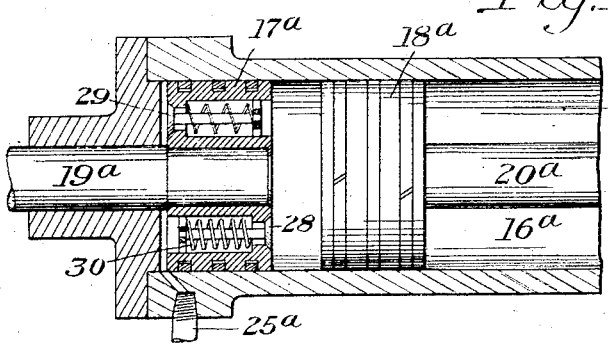
Figure 15 is a sectional view showing a modified form of air cylinder piston.

In Figure 15 there is illustrated a modified form of piston for effecting the desired operation of the parts. In this construction there is provided a piston 17$^a$ containing two oppositely opening valves 28 and 29. When air enters the pipe 25$^a$ it moves the piston to the right as before. When the piston 17$^a$ finishes its stroke, the air overcomes the pressure of the spring 30 and bleeds through the valve 28 to operate the piston 18$^a$. On the return stroke the air between the two pistons is discharged through the valve 29 into the cylinder back of the piston 17$^a$, from where it is discharged through the pipe 25$^a$.

A space is provided between the pistons 17 and 18 to prevent shocks, to allow for adjustment and to permit the use of different sizes of pre-forming molds according to the requirements of the product.

It will be apparent that the operating cylinder may be placed on either side of the glass receivers, as may be dictated by the design and operation of the glass working machine, its direction of rotation if it be of the rotary type, the position of the operator, the disposition of associated mechanisms and the demands of accessibility.

The receiver 5 has secured to the opposite sides thereof two brackets 31. Holes in the brackets 31 engage studs 32. The studs 32 are held stationary, one being supported by the operating cylinder 16, and the other being carried by a pedestal 33 extending upwardly from the channel 9. Springs 34 surrounding the studs bear on the brackets 31 and always hold the receiver 5 against the top of the pre-forming mold 6. The studs are preferably in substantially transverse alinement with the point where the glass is sheared, as I have found that this prevents any jumping of the receiver 5 during the shearing operation and ensures a clean cut.

To ensure smooth working I lubricate the sliding joint between the upper receiver 5 and the pre-forming mold 6 by a lubricating pad 35. This pad is supplied with oil by gravity from oil cups 36. Two of these oil cups are preferably provided to ensure a supply of oil even if one cup should become empty or clogged up.

To prevent the pad from being pulled out of place by the upper corner of the half-mold 7 as it moves under the pad, it may be desirable to provide an extension 11$^a$ for the top plate 11. The plate 11$^a$ allows the half-mold 7 to move back to normal position, as clearly shown in Figures 1—4 without the edge catching on the lubricating pad 35.

As the top plate 11 of the half-mold 7 cooperates with the shearing ring 10 to provide cutting means for the glass stream it will be apparent that the cooperating cutting edges in time become worn. To compensate for this and thereby increase the length of life of the apparatus the ring 10 is preferably made circular and secured to the receiver 5 by evenly spaced screws permitting it to be moved around when it wears, to provide a new cutting edge. When the plate 11 wears back, the half-molds 7 and 8 may be reversed, the extension 11$^a$ attached to the half-mold 8, and the cutting done by the plate 11 of the half-mold 8.

Figure 12:
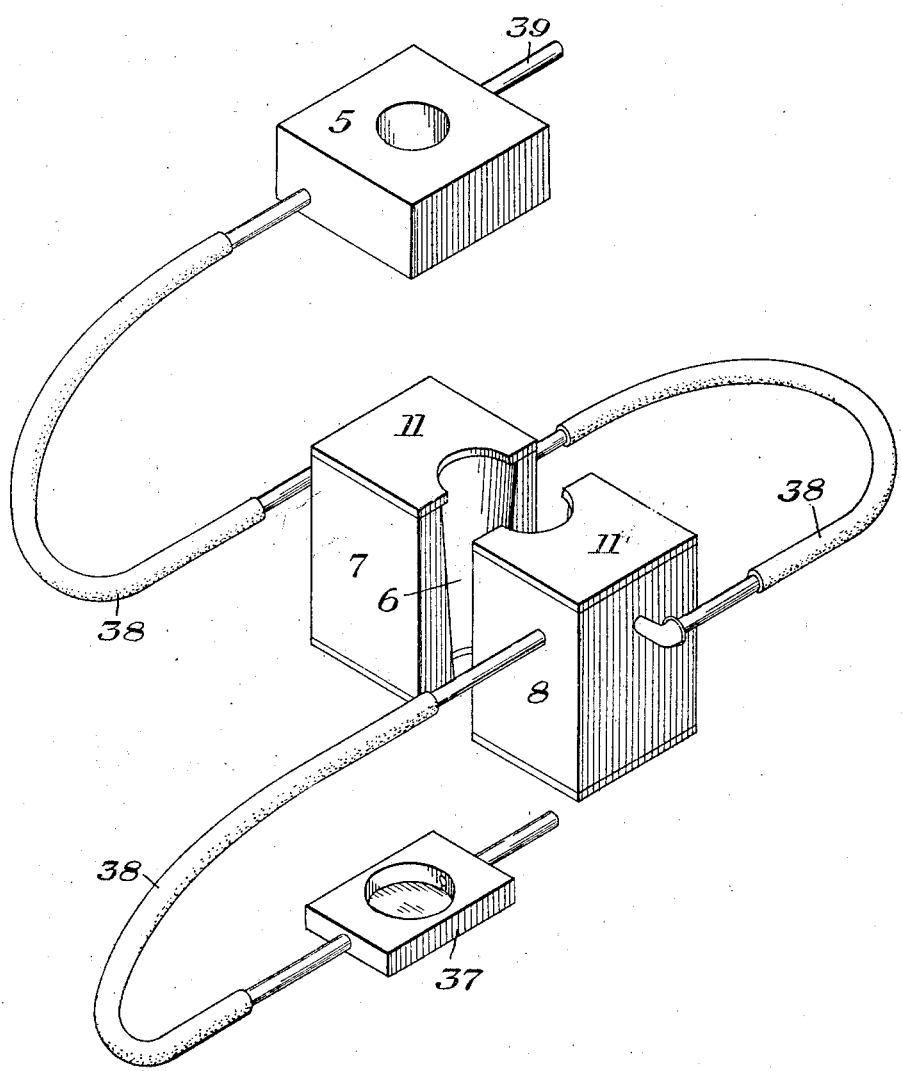
Figure 12 is a diagrammatic perspective view illustrating the method of water cooling.
Figure 13:
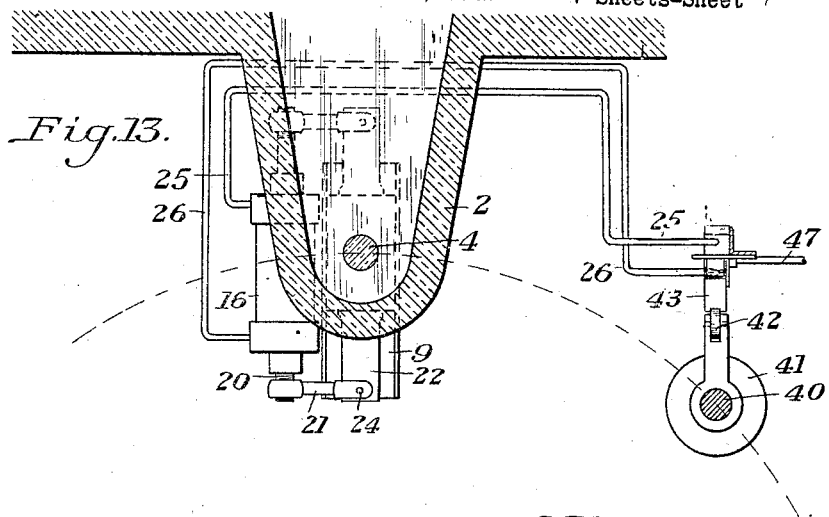
Figure 13 is a diagrammatic view illustrating the method of timing the operating cylinder.

The parts exposed to the molten glass are preferably water cooled. As diagrammatically shown in Figure 12, the cooling water is first circulated through the upper receiver 5, since it is exposed to the hottest glass and also to the heat from the boot 2 and from the tank. From the receiver 5 the water passes to the half-mold 7, which is closest to the tank, and then to its mate 8. The water finally passes to a stationary cooler 37 attached to the bottom of the channel 9. Flexible hose connections 38 are provided between the parts to permit the movement of the half-molds 7 and 8.

As shown in Figures 9 and 10, the cooling water is admitted through a pipe 39 attached to any suitable water supply (not shown) and is circulated through suitable channels very close to the shearing ring 10 to make certain that the glass will be cleanly and evenly sheared.

Figure 8:
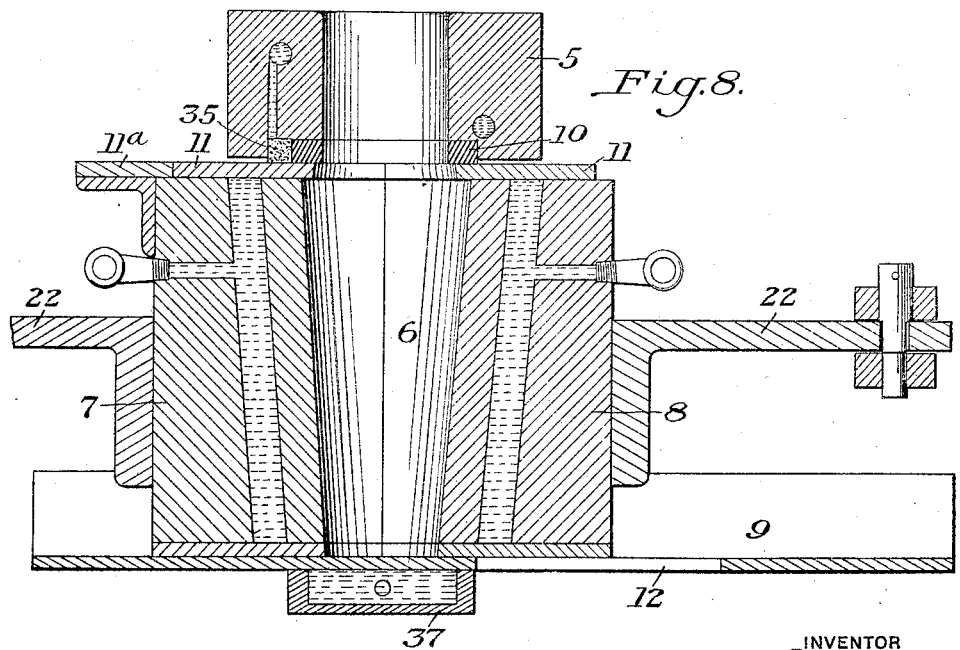
Figure 8 is a sectional view on the line VIII—VIII of Figure 5.

The half-molds may be cooled by providing the same with arcuate water spaces, as shown in Figures 5 and 8. The water may enter at the end of each of the mold sections and leave at one of the sides, as this facilitates the hose connections and gives the water a chance to circulate through the cooling spaces.

Figure 14:
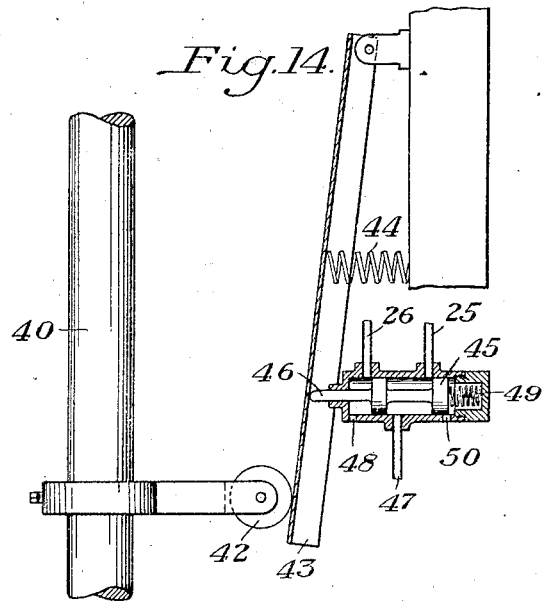
Figure 14 is a view, partly in section, showing the air valve controlling the operating cylinder.

The operation of the feeder may conveniently be controlled automatically by the glass working machine which is fed thereby. In the illustrated embodiment of my invention, which shows the feeder applied to a bottle blowing machine, it may be operated by the motion of the piercing tool which forms the initial blow opening. When a charge of glass is fed into the parison mold, the machine rotates to its succeeding position, where the charge is pierced to form the "dummy" from which the bottle is blown. As illustrated in Figures 14 and 15, a rod 40 carrying the piercing tool 41 is set over the path of travel of the molds. In the operation of the glass working machine, a mold is filled with a charge of molten glass and is then rotated to the piercing position, while the preceding mold moves to the charging position. The piercing rod 40 carries a roller 42 which bears against a swinging arm 43. A spring 44 holds the arm 43 against the roller 42. Underneath the arm 43, and carried by a suitable fixed support, is an air control valve 45. The stem 46 of the valve is moved in and out by the pressure of the arm 43.

In Figure 14 the piercing rod 40 is represented as having descended to form the dummy. The roller 42 has moved the arm 43 laterally and forced the valve stem to the right. Air from the supply line 47 passes through the valve 45 into the line 25, actuating the pistons 17 and 18, as described, and delivering a charge of glass to the parison mold at the charging position. The air ahead of the piston 18 passes off through the pipe 26 and the opening 48 in the valve 45.

When the piercing rod reascends, the roller 42 moves with it, the arm 43 swings outwardly under the action of the spring 44, and the valve spring 49 moves the valve to the left. Air then passes to the operating cylinder for returning the pre-forming mold 6 to normal or receiving position for the next charge through the pipe 26, and the exhaust air escapes from said cylinder through the pipe 25, valve 45 and port 50.

Certain advantages of my invention arise from the provision of a simple and reliable glass feeding apparatus which delivers predetermined and uniform charges of glass to the glass working machine. Other advantages arise from elimination of blister, hair lines and other defects due to improper feeding.

I claim:

1. Glass feeding apparatus, comprising a source of molten glass having a flow opening, a movable receiver normally in the line of flow through said opening, a stationary receiver thereabove, means for moving the movable receiver out of said line of flow, and means for supplying a lubricant between the movable and stationary receivers, substantially as described.

2. Glass feeding apparatus, comprising a source of molten glass having a flow opening, superimposed receivers for receiving the flow through said opening, means for severing the glass between said receivers, and means for lubricating the severing means, substantially as described.

3. Operating means for a glass feeding apparatus, comprising a fluid pressure cylinder, a plurality of pistons therein, and means for effecting differential piston movements, substantially as described.

4. Operating means for a glass feeding apparatus, comprising a fluid pressure cylinder, two pistons therein, a source of actuating fluid, means for supplying operating fluid to one piston until its stroke is completed and for supplying operating fluid to the other piston from the time the stroke of the first piston is completed until the stroke of the second piston is completed, substantially as described.

5. Glass forming apparatus, comprising a source of molten glass having a flow opening, a movable receiver adapted to lie in the line of flow, an open bottomed stationary receiver in the line of flow and immediately above the movable receiver, the stationary receiver normally permitting free flow to the movable receiver, means for periodically moving the movable receiver, the receivers having portions adapted to sever the stream on such movement, the movable receiver having a portion adapted to close off the bottom of the stationary receiver during such movement, and means for cooling and lubricating the receiver portions adapted to sever the stream, substantially as described.

6. Glass forming apparatus, comprising a source of molten glass having a flow opening, a receiver adapted to receive the glass and preform the same, such receiver being tapered toward the bottom, means for severing the stream, means for discharging the severed gather, an open bottomed receiver above the preforming receiver for collecting the glass during such discharge, the horizontal cross section of the open bottomed receiver at the bottom being at least as great as at any other point and greater than the horizontal cross section of the preforming receiver at the bottom, and glass supporting means for closing off the bottom of the open bottomed receiver during the discharge of the gather, substantially as described.

In testimony whereof I have hereunto set my hand.

HARRY B. LAWSON.